United States Patent
Jiang et al.

(10) Patent No.: US 10,783,459 B2
(45) Date of Patent: Sep. 22, 2020

(54) METHOD AND DEVICE FOR PROVIDING TICKET INFORMATION

(71) Applicant: Xiaomi Inc., Beijing (CN)

(72) Inventors: Dongya Jiang, Beijing (CN); Jiankai Zhao, Beijing (CN); Zhenhai Zhao, Beijing (CN)

(73) Assignee: Xiaomi Inc., Beijing (CN)

( * ) Notice: Subject to any disclaimer, the term of this patent is extended or adjusted under 35 U.S.C. 154(b) by 717 days.

(21) Appl. No.: 15/222,279

(22) Filed: Jul. 28, 2016

(65) Prior Publication Data

US 2017/0032287 A1    Feb. 2, 2017

(30) Foreign Application Priority Data

Jul. 31, 2015  (CN) .......................... 2015 1 0463427

(51) Int. Cl.
| | | |
|---|---|---|
| *H04M 1/725* | (2006.01) | |
| *H04W 4/12* | (2009.01) | |
| *G06Q 10/02* | (2012.01) | |
| *G06Q 50/10* | (2012.01) | |
| *G06Q 30/06* | (2012.01) | |

(52) U.S. Cl.
CPC ......... *G06Q 10/02* (2013.01); *G06Q 30/0601* (2013.01); *G06Q 50/10* (2013.01); *H04M 1/72547* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 6,874,011 B1* | 3/2005 | Spielman ................ | H04L 29/06 379/88.12 |
| 8,438,228 B1* | 5/2013 | Gunasekara ........... | G06Q 10/10 709/206 |
| 2004/0015505 A1* | 1/2004 | Quick .................. | G06Q 10/107 |
| 2005/0083413 A1 | 4/2005 | Reed et al. | |
| 2005/0289113 A1 | 12/2005 | Bookstaff | |
| 2006/0111967 A1* | 5/2006 | Forbes ............... | G06Q 30/0267 705/14.26 |
| 2007/0092114 A1* | 4/2007 | Ritter ..................... | G06F 21/32 382/115 |
| 2010/0029335 A1* | 2/2010 | Vartanian .............. | G06F 3/0412 455/566 |

(Continued)

FOREIGN PATENT DOCUMENTS

| | | |
|---|---|---|
| CN | 1801976 | 7/2006 |
| CN | 101799816 | 8/2010 |

(Continued)

OTHER PUBLICATIONS

Extended European Search Report for European Application No. 16179246.0, dated Nov. 2, 2016, 7 pgs.

(Continued)

*Primary Examiner* — Tonya Joseph
(74) *Attorney, Agent, or Firm* — Finnegan, Henderson, Farabow, Garrett & Dunner, L.L.P.

(57) ABSTRACT

A method for providing ticket information is provided. The method includes: receiving a notification; determining whether the notification includes the ticket information; and if the notification includes the ticket information, providing the ticket information in a multimedia message.

20 Claims, 13 Drawing Sheets

(56) References Cited

U.S. PATENT DOCUMENTS

| | | | | |
|---|---|---|---|---|
| 2010/0063962 A1* | 3/2010 | Goradia | ............... | G06F 16/188 |
| | | | | 707/640 |
| 2010/0131530 A1* | 5/2010 | Gibson | ............... | G06F 16/9038 |
| | | | | 707/758 |
| 2010/0219234 A1 | 9/2010 | Forbes | | |
| 2010/0223341 A1 | 9/2010 | Manolescu et al. | | |
| 2013/0179559 A1* | 7/2013 | Chen | ......................... | G06F 8/65 |
| | | | | 709/224 |
| 2013/0313314 A1* | 11/2013 | Jeng | ................... | G06Q 20/0457 |
| | | | | 235/375 |
| 2014/0100896 A1* | 4/2014 | Du | .......................... | G07B 11/00 |
| | | | | 705/5 |
| 2014/0325391 A1 | 10/2014 | Zhang | | |
| 2015/0185022 A1 | 7/2015 | Yoo et al. | | |
| 2015/0193701 A1 | 7/2015 | Sohn et al. | | |
| 2016/0173428 A1* | 6/2016 | Balasubramanian | ......................... | |
| | | | | G06F 16/335 |
| | | | | 709/206 |

FOREIGN PATENT DOCUMENTS

| | | | |
|---|---|---|---|
| CN | 102073705 A | 5/2011 | |
| CN | 102137341 | 7/2011 | |
| CN | 102739866 | 10/2012 | |
| CN | 104112206 A | 10/2014 | |
| CN | 104281372 A | 1/2015 | |
| CN | 104601812 A | 5/2015 | |
| CN | 104717293 A | 6/2015 | |
| CN | 105068976 | 11/2015 | |
| EP | 3041205 A2 | 7/2016 | |
| JP | 2002189933 A | 7/2002 | |
| JP | 2003187272 A | 7/2003 | |
| KR | 20070077944 A | 7/2007 | |
| KR | 20090088499 A | 8/2009 | |
| KR | 20100117314 A | 11/2010 | |
| RU | 2397543 C2 | 8/2010 | |
| RU | 117671 U1 | 6/2012 | |
| WO | WO-03098503 A1 * | 11/2003 | ........... G07F 7/0866 |

OTHER PUBLICATIONS

English version of International Search Report for International Application No. PCT/CN2015/097787 and English translation thereof, dated Apr. 27, 2016, 3 pages.

International Search Report for International Application No. PCT/CN2015/097787, dated Apr. 27, 2016, 5 pages.

Chuan Zhi Bo Ke Higher Education Product R&D Dept., "Android Mobile Application Foundation Course", China Railway Publishing House (7 pgs), Jan. 2015.

* cited by examiner

METHOD AND DEVICE FOR PROVIDING TICKET INFORMATION

CROSS-REFERENCE TO RELATED APPLICATION

This application is based upon and claims priority to Chinese Patent Application No. 201510463427.X, filed Jul. 31, 2015, the entire contents of which are incorporated herein by reference.

TECHNICAL FIELD

The present disclosure generally relates to the field of Internet technology and, more particularly, to a method and device for providing ticket information.

BACKGROUND

With the proliferation of online group shopping, it becomes popular among customers to purchase movie tickets on online group-shopping platforms because of the cost saving offered by the group-shopping platforms. After a customer purchases a movie ticket via an online group-shopping platform, a the smart phone of the customer may receive a text message notification from the network platform, such that the customer may pick up a physical movie ticket in a movie theater by presenting a verification code in the text message notification. Conventionally, the text message notification is provided in a text form, with certain information being highlighted, such as the verification code and the show time of the movie.

SUMMARY

According to a first aspect of the present disclosure, there is provided a method for providing ticket information, comprising: receiving a notification; determining whether the notification includes the ticket information; and if the notification includes the ticket information, providing the ticket information in a multimedia message.

According to a second aspect of the present disclosure, there is provided a device for providing ticket information, comprising: a processor; and a memory for storing instructions executable by the processor. The processor is configured to: receive a notification; determine whether the notification includes the ticket information; and if the notification includes the ticket information, provide the ticket information in a multimedia message.

According to a third aspect of the present disclosure, there is provided a non-transitory computer-readable storage medium having stored therein instructions that, when executed by a processor of a terminal device, cause the terminal device to perform a method for providing ticket information, the method comprising: receiving a notification; determining whether the notification includes the ticket information; and if the notification includes the ticket information, providing the ticket information in a multimedia message.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1A:
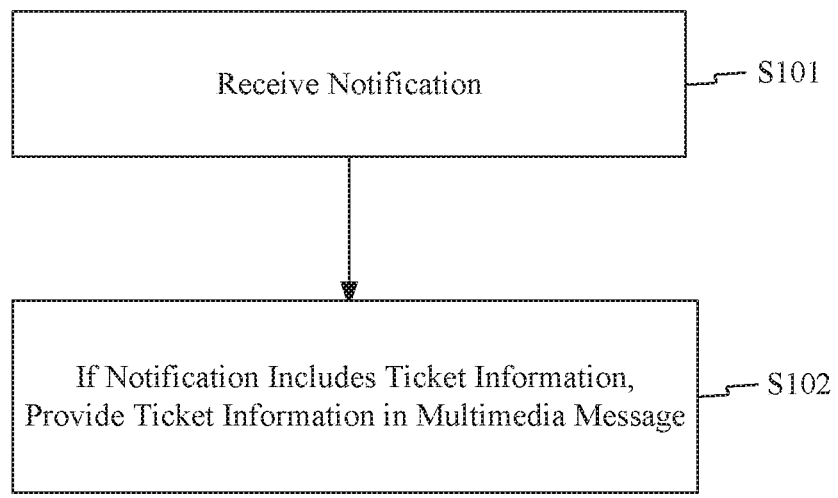
FIG. 1A is a flowchart of a method for providing ticket information, according to an exemplary embodiment.

FIG. 1A is a flowchart of a method 100a for providing ticket information, according to an exemplary embodiment. The method 100a may be performed by a terminal device, such as a smart phone or a tablet device, and may be implemented as an application installed on the terminal device. Referring to FIG. 1A, the method 100a includes the following steps.

In step S101, the terminal device receives a notification, such as a text message, an instant messaging (IM), or the like. In some implementations, the notification may be sent by a server.

In step S102, if the notification includes ticket information, the terminal device provides the ticket information in a multimedia message.

In some embodiments, the ticket information may include one or more admission tickets for entrance to particular places during a time period, such as movie tickets, theater tickets, concert tickets, landmark tickets and the like.

In some embodiments, the notification may include a text message. The terminal device may identify an e-commerce platform providing the ticket information based on the received text message, obtain a text message template corresponding to the e-commerce platform based on a template database, and determine whether the text message includes ticket information based on the text message template. For example, the e-commerce platform is an online group shopping website with the name of AAA. When a user purchases a movie ticket for a movie with the name of Les Miserables on the online group shopping website, the word "AAA" may be identified from the text message, and whether ticket information is included in the text message may be determined based on the text message template corresponding to "AAA". For example, the content of a text message sent from the e-commerce platform are as follows: "AAA group shopping: ticket information: Jul. 14, 2015, Les Miserables, Broadway Cinematheque, Seat number 7, Row F, Room 3." Thus, the AAA e-commerce platform may be identified by "AAA group shopping" in the text message, and a text message template corresponding to the AAA e-commerce platform may be obtained. According to the format of the text message template, the terminal device may identify that the text message relates to a movie ticket purchased on the e-commerce platform by the user, and the name of the movie is Les Miserables.

In some embodiments, the terminal device identifies a keyword representing the ticket information from the notification. It then determines whether the keyword is included in a keyword database storing keywords in ticket information. If the keyword is included in the keyword database, it is determined that the notification includes the ticket information. For example, the keyword may be "movie ticket", "ticket release", or "go to the movie theater on time" and the like. When a keyword such as "movie ticket" is identified from the notification, the terminal device determines that ticket information is included in the notification. In some embodiments, the keyword database may be continuously updated based on keywords representing ticket information, thereby improving the accuracy of keywords identification.

Figure 1B:
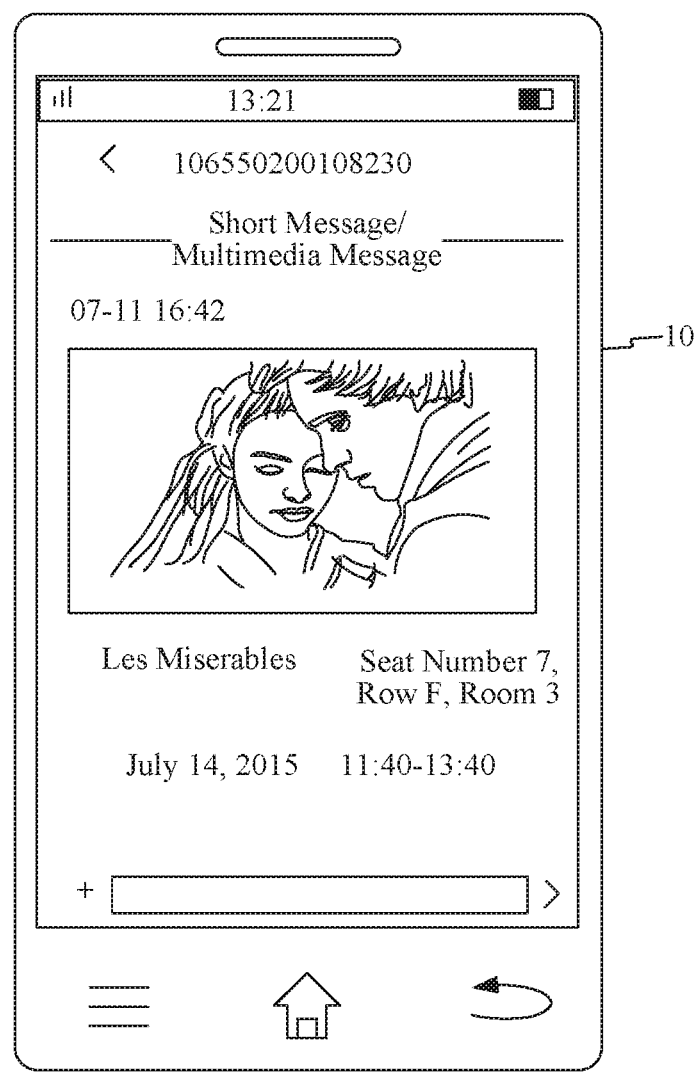
FIG. 1B is a schematic diagram showing a multimedia message, according to an exemplary embodiment.

In some embodiments, templates of multimedia messages with different styles may be stored in a storage module, allowing users to personalize the multimedia messages according to their preferences. FIG. 1B is a schematic diagram 100b showing a multimedia message, according to an exemplary embodiment. As shown in FIG. 1B, after determining the movie name (i.e., Les Miserables), show time and seat information in the ticket information, the poster of the movie (i.e., Les Miserables), the show time, and seat information is presented on the terminal device 10 in a multimedia message.

By providing the ticket information in a multimedia message, a vivid and diversified presentation of ticket information can be provided, thereby bringing visual satisfaction to users.

In some embodiments, the terminal device may search a poster relating to the ticket information via a network interface, identify a ticket name and seat information in the ticket information which is included in the notification, and provide the poster, the ticket name and the seat information in the multimedia message.

In some embodiments, the terminal device may further detect whether a trigger action is received on the multimedia message. If the trigger action is detected, the terminal device can search additional ticket information via a network interface and provide the additional ticket information in the multimedia message.

In some embodiments, the terminal device may identify an e-commerce platform providing the ticket information from the notification, obtain a text message template corresponding to the e-commerce platform from a template database, where the template database is configured to store text message templates of e-commerce platforms, and determine whether there is the ticket information in the notification according to the text message template.

In some embodiments, in determining an e-commerce platform providing the ticket information, the terminal device may identify a keyword in the notification, determine whether the keyword is included in a database which is configured to store enterprise names corresponding to keywords, and if the keyword is included in the database, obtain an enterprise name in the database corresponding to the keyword as the e-commerce platform providing the ticket information.

In other embodiments, in determining an e-commerce platform providing the ticket information, the terminal device may identify a text message number associated with the notification, such as a text message number of a sender of the notification, determine whether the text message number is included in a database which is configured to store text message numbers of enterprises and enterprise names corresponding to the text message numbers, and if the text message number is included in the database, obtain an enterprise name in the database corresponding to the text message number as the e-commerce platform providing the ticket information.

In some embodiments, if no text message template corresponding to the e-commerce platform is included in the template database, the terminal device may update the template database to include the text message template corresponding to the e-commerce platform.

In some embodiments, the terminal device may identify a keyword representing the ticket information from the notification, determine whether the keyword is included in a database which is configured to store keywords included in ticket information, and if the keyword is included in the database, determine that the notification includes the ticket information.

Figure 2A:
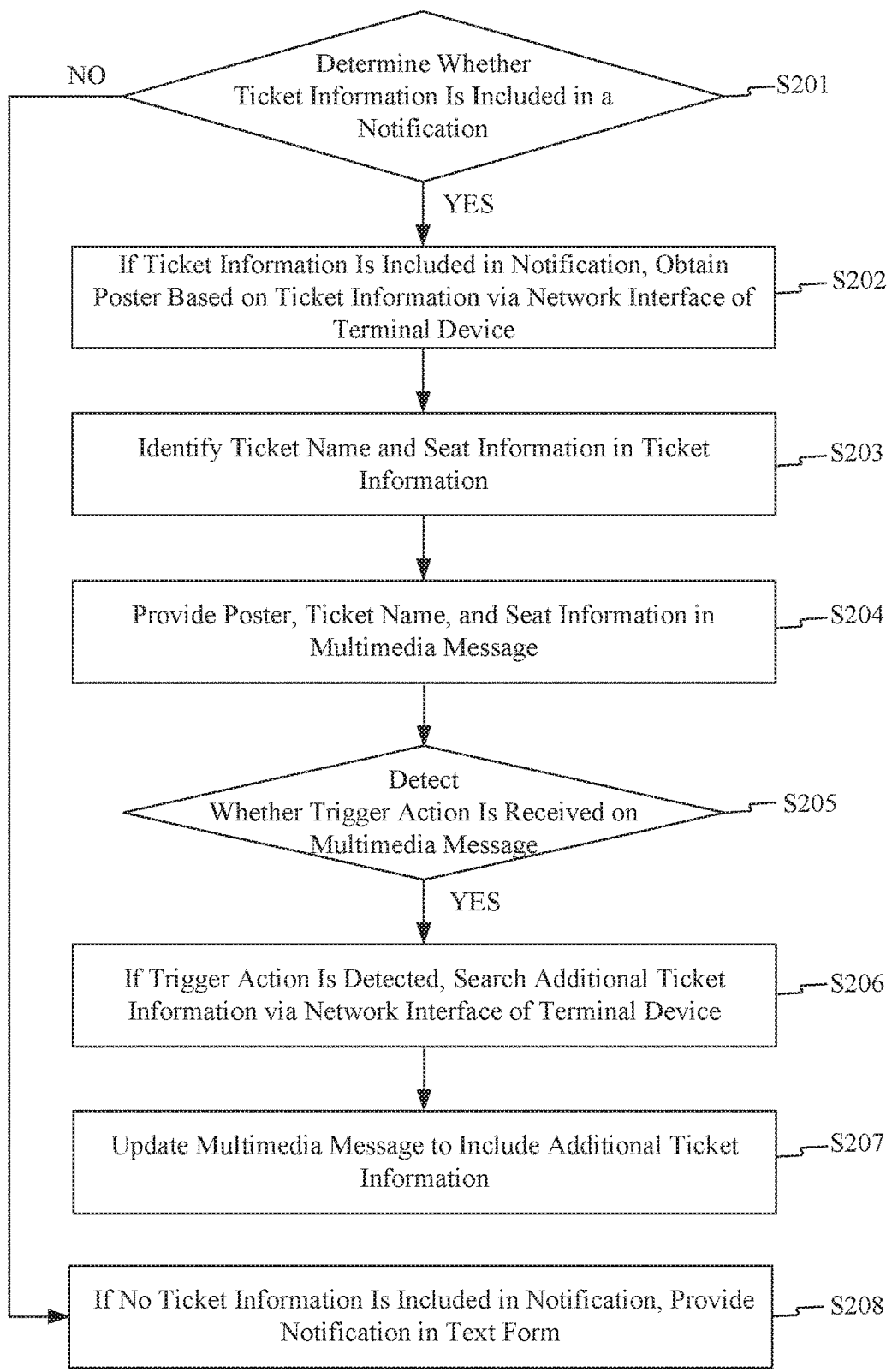
FIG. 2A is a flowchart of another method for providing ticket information, according to an exemplary embodiment.

FIG. 2A is a flowchart of a method 200a for providing ticket information, according to an exemplary embodiment. The method 200a may be performed by a terminal device, such as a smart phone or a tablet device. Referring to FIG. 2A, the method 200a includes the following steps.

In step S201, the terminal device determines whether ticket information is included in a notification received by the terminal device. The notification may be sent from an e-commerce platform providing the ticket information. If ticket information is included in the notification, step S202 is performed. If ticket information is not included in the notification, step S208 is performed.

The implementation of step S201 may be the same as step S101 described above in connection with FIG. 1A, and the description is not repeated here.

In step S202, if ticket information is included in the notification, the terminal device obtains a poster based on the ticket information via a network interface.

In some embodiments, the network interface of the terminal device may be a 3G/4G network interface, a WIFI network interface, or any other network interface for the terminal device to access the Internet and obtain the poster. The present disclosure does not impose limitations on the type of the network interface. In some implementations, the ticket information may include a movie ticket, and the poster of the movie may include a picture produced by the movie producer for promoting the movie, such as the picture shown in FIG. 1B. By providing the movie poster in a multimedia message, users may recognize the movie in the movie ticket when seeing the picture.

In step S203, the terminal device identifies a ticket name and seat information in the ticket information.

In some embodiments, the ticket name and seat information in the ticket information may be identified based on a text message template, as described above in connection with step S102.

In step S204, the terminal device provides the poster, the ticket name, and the seat information in a multimedia message.

Referring to FIG. 1B, the poster of the movie, the ticket name (i.e., "Les Miserables") and corresponding seat information (i.e., Seat number 7, Row F, Room 3), and show time of the movie are provided in the multimedia message. In doing so, notifications from the e-commerce platform are presented to users visually by the multimedia message.

In step S205, the terminal device detects whether a trigger action is received on the multimedia message.

In step S206, if the trigger action is detected, the terminal device searches additional ticket information via a network interface of the terminal device. In some implementations, the terminal device may continue to detect for the trigger action if no trigger action is detected in step S205.

In step S207, the terminal device updates the multimedia message to include the additional ticket information.

Figure 2B:
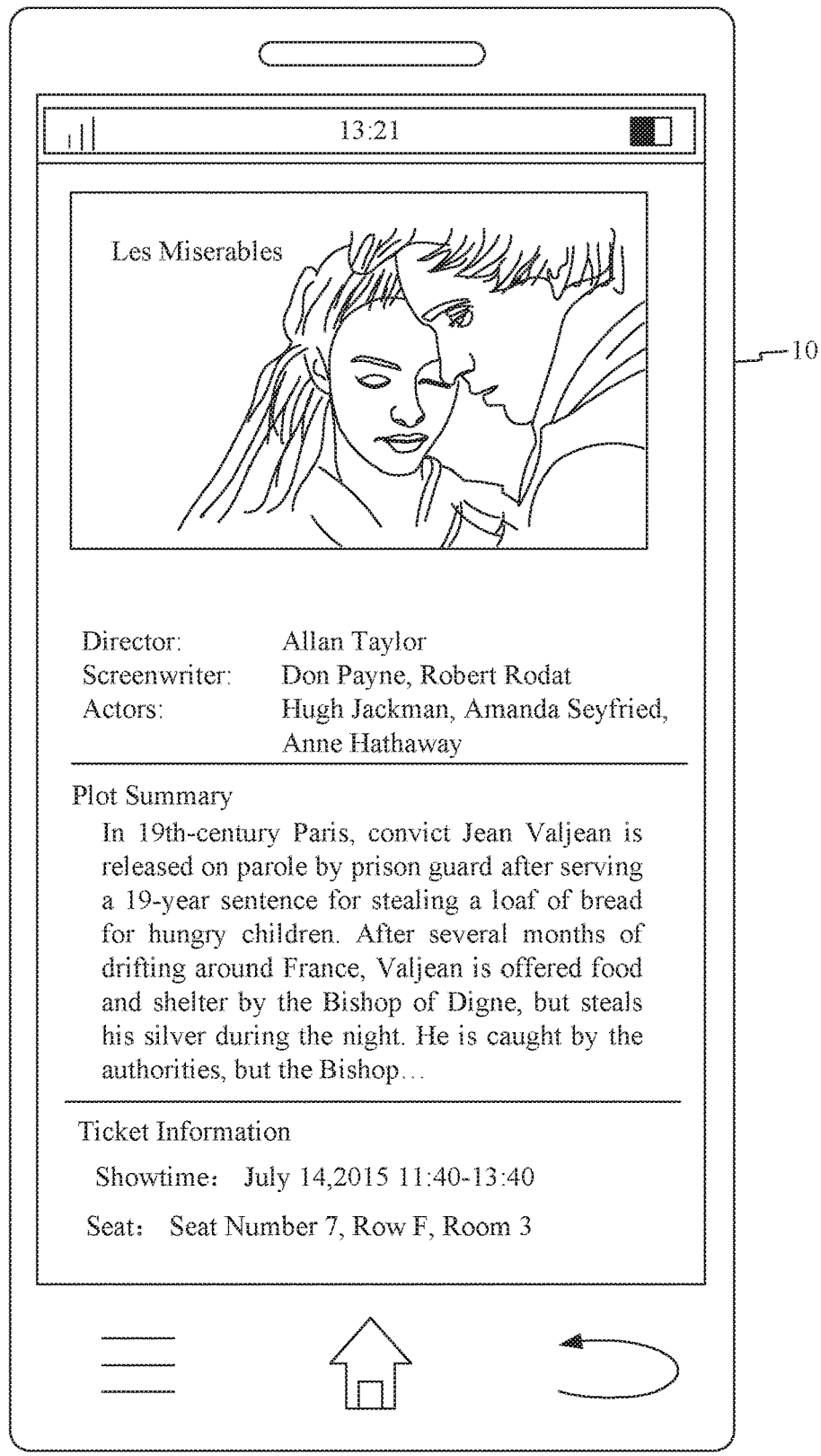
FIG. 2B is a schematic diagram showing a multimedia message providing additional ticket information, according to an exemplary embodiment.

In some embodiments, the multimedia message may include a user interface, and tapping (or clicking) on the multimedia message may trigger the terminal device to search additional ticket information relating to the ticket name via the network interface. After the additional ticket information is obtained, the terminal device updates the multimedia message to include the additional ticket information. FIG. 2B is a schematic diagram showing a multimedia message 200b providing additional ticket information, according to an exemplary embodiment. As shown in FIG. 2B, the additional ticket information may include information relating to the movie such as reviews for the movie, information of cast members (e.g., the director, the screenwriter and the actors), information relating to the ticket such as the show time, the seat number, the address, and the like.

In step S208, if no ticket information is included in the notification, the terminal device provides the notification in a text form.

By including the additional ticket information in the multimedia message, the terminal device presents additional content in the multimedia message, such that a user may learn additional ticket information without performing manual searching on a network, thereby improving user experience.

Figure 3A:
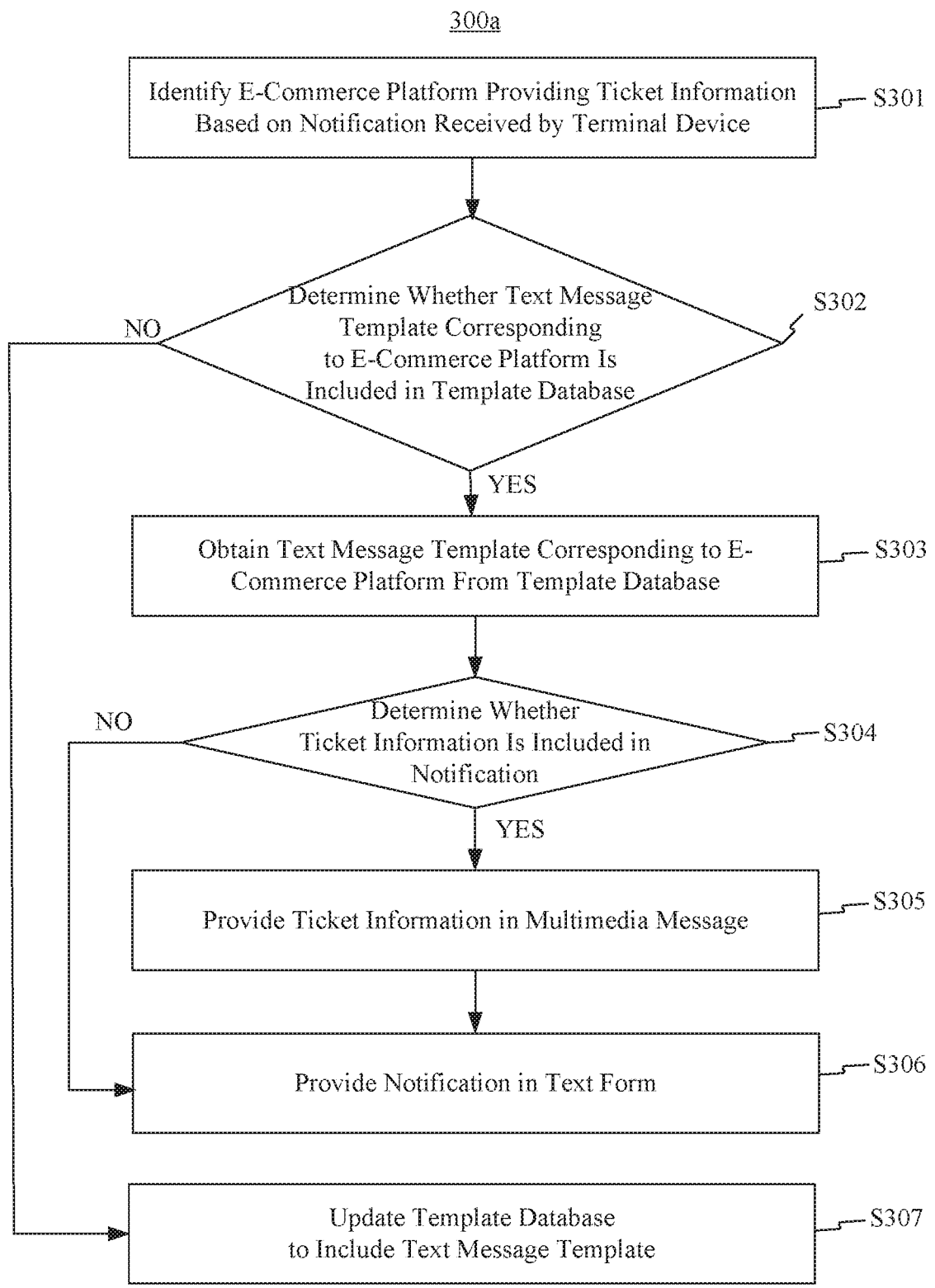
FIG. 3A is a flowchart of another method for providing ticket information, according to an exemplary embodiment.

FIG. 3A is a flowchart of a method 300a for providing ticket information, according to an exemplary embodiment. The method 300a may be performed by a terminal device, such as a smart phone or a tablet device. Referring to FIG. 3A, the method 300a includes the following steps.

In step S301, the terminal device identifies an e-commerce platform providing ticket information based on a notification received by the terminal device.

In some embodiments, the name of the e-commerce platform may be identified from the notification by semantic recognition. In other embodiments, the name of the e-commerce platform may be identified from the notification by word matching. For example, the names of a plurality of e-commerce platforms providing ticket information may be stored in a platform list, and the notification may be matched with the names in the platform list so as to identify the name of the e-commerce platform in the notification. For example, the name of the e-commerce platform may be AAA. In step S302, the terminal device determines whether a text message template corresponding to the e-commerce platform is included in a template database. If the text message template corresponding to the e-commerce platform is included in the template database, step S303 is performed. If the text message template corresponding to the e-commerce platform is not included in the template database, step S307 is performed.

In step S303, the terminal device obtains the text message template corresponding to the e-commerce platform from the template database. The template database is configured to store text message templates of e-commerce platforms.

In step S304, the terminal device determines whether ticket information is included in the notification according to the text message template. If ticket information is included in the notification, step S305 is performed, If no ticket information is included in the notification, step S306 is performed.

In some embodiments, different e-commerce platforms may employ different text message templates to provide text message notification services for users. By storing the text message templates corresponding to different e-commerce platforms in the template database, the identification of ticket information in the notification may be more accurate. For example, the e-commerce platform may be an online group shopping website with the name of AAA and employs a text message template as follows: "AAA online group shopping: ticket information: time, name, address, seat number." By identifying corresponding content in the notification according to the text message template, the terminal device may determine whether ticket information is included in the notification.

In step S305, if ticket information is included in the notification, the terminal device provides the ticket information in a multimedia message. The implementation of step S305 may be the same as step S102 described above in connection with FIG. 1A, and the description is not repeated here.

In step S306, if no ticket information is included in the notification, the terminal device provides the notification in a text form.

In step S307, the terminal device updates the template database to include the text message template of the e-commerce platform.

In some embodiments, the terminal device may send to a server an update request which includes the name of the e-commerce platform. After receiving the update request, the server sends the text message template of the e-commerce platform to the terminal device, and the terminal device updates the template database to include the text message template. In doing so, manual input of the text message template by a user can be avoided, thereby improving user experience. In other embodiments, a user may edit and modify a text message template on a terminal device, and the text message template may be included into the template database. In doing so, the network loading of the terminal device and the server may be reduced. In some implementations, the template database may be produced and maintained by the online retailers providing e-commerce services via the server.

Figure 3B:
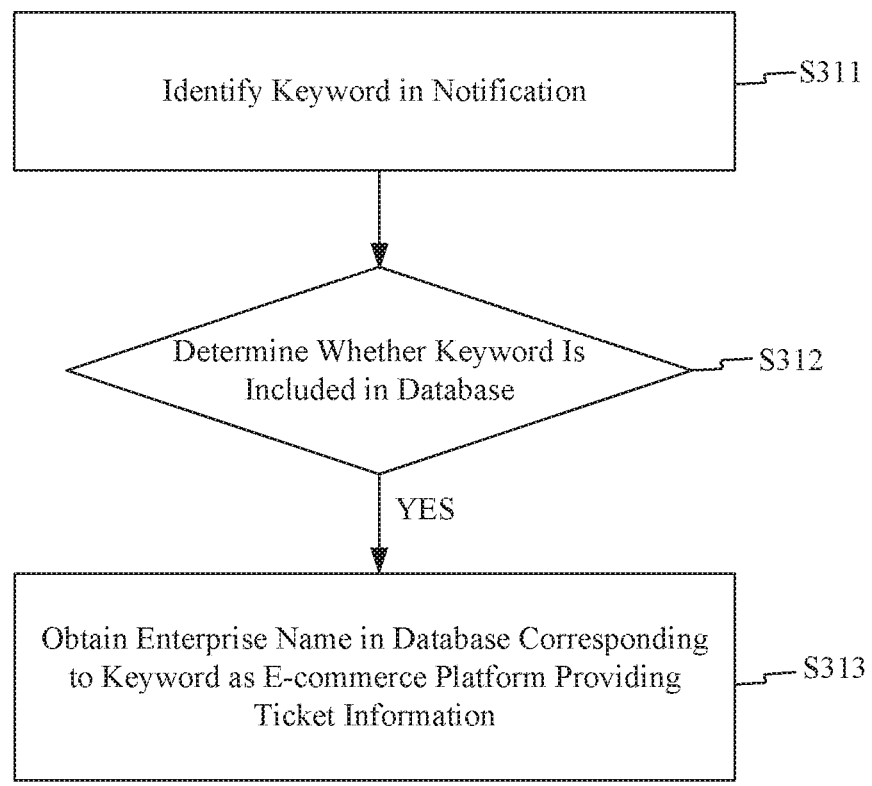
FIG. 3B is a flowchart of a method for identifying an e-commerce platform, according to an exemplary embodiment.

FIG. 3B is a flowchart of a method 300b for identifying an e-commerce platform, according to an exemplary embodiment. The method 300b may be performed by a terminal device, such as a smart phone or a tablet device. In the method 300b, keywords in the notification may be used to identify the e-commerce platform. Referring to FIG. 3B, the method 300b includes the following steps.

In step S311, the terminal device identifies a keyword in the notification.

In step S312, the terminal device determines whether the keyword is included in a database. The database is configured to store enterprise names corresponding to keywords.

In step S313, if the keyword is included in the database, the terminal device obtains an enterprise name in the database corresponding to the keyword as the e-commerce platform providing the ticket information. In some implementations, if no keyword is included in the database, no process is performed by the terminal device. For example, the notification may be presented in a usual form such as a text form.

In some embodiments, different e-commerce platforms may have different enterprise names. The enterprise names of the e-commerce platforms may be stored in the database, and then the e-commerce platform sending the notification may be identified by the keyword. The database may be updated continuously so as to improve the accuracy of the keyword identification. For example, the keyword identified from the notification may be AAA. If the database includes the keyword AAA or another keyword representing the same e-commerce platform, such as AAA1, the terminal device may determine the e-commerce platform providing the ticket information as AAA.

Figure 3C:
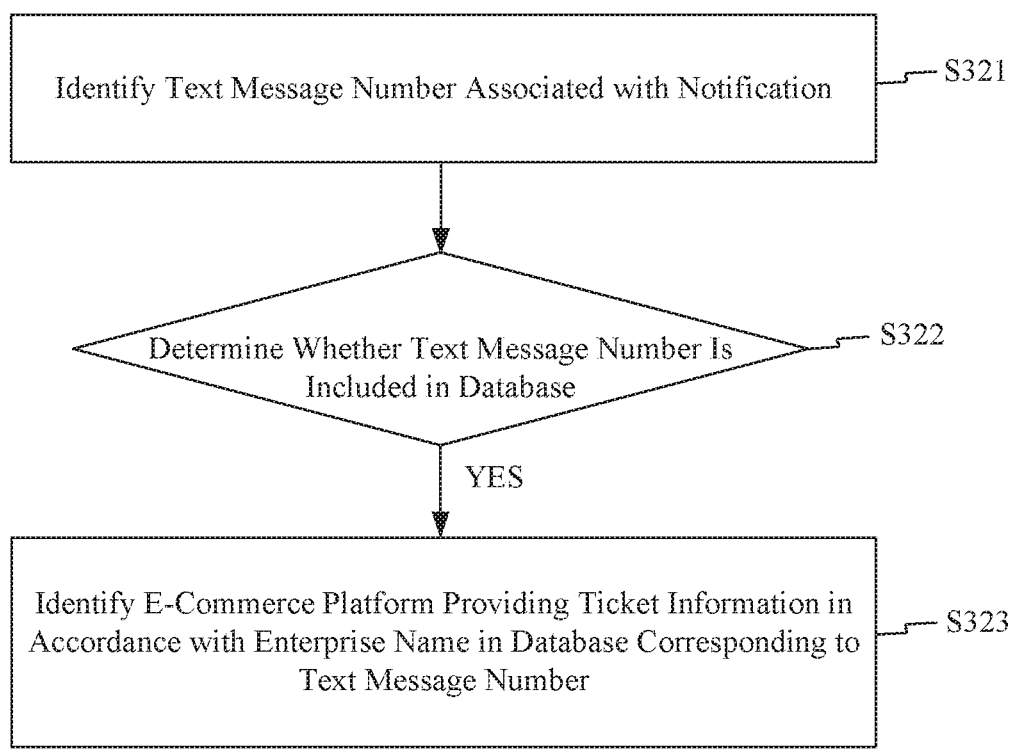
FIG. 3C is a flowchart of another method for identifying an e-commerce platform, according to an exemplary embodiment.

FIG. 3C is a flowchart of another method 300c for identifying an e-commerce platform, according to an exemplary embodiment. The method 300c may be performed by a terminal device, such as a smart phone or a tablet device. In the method 300c, the e-commerce platform may be identified by a text message number associated with the notification. Referring to FIG. 3C, the method 300c includes the following steps.

In step S321, the terminal device identifies a text message number associated with the notification, such as the text message number of the sender sending the notification.

In step S322, the terminal device determines whether the text message number is included in a database, where the database is configured to store enterprise names corresponding to the text message numbers.

In step S323, if the text message number is included in the database, the terminal device identifies the e-commerce platform providing the ticket information in accordance with an enterprise name in the database corresponding to the text message number. In some implementations, if no text message number is included in the database, no process is performed by the terminal device. For example, the notification may be presented in a usual form such as a text form.

In some embodiments, different e-commerce platforms may send notifications using different text message numbers. By storing text message numbers and corresponding e-commerce platforms in the database, the e-commerce platform sending the notification can be identified based on the text message number. The database may be continuously updated according to the text message numbers of enterprises, so as to improve the accuracy of identifying of the text message number. For example, the text message number identified from the notification may be 10690899124114. If an e-commerce platform AAA corresponding to 10690899124114 is included in the database, the terminal device can determine that the e-commerce platform providing the ticket information is AAA.

By identifying the text message number associated with the notification, and determining whether ticket information is included in the notification based on the text message number and a database, the accuracy for identifying the ticket information can be improved. The database may be continuously updated for accurately identifying the text message numbers corresponding to e-commerce platforms, so as to improve the identification of E-commerce platforms providing ticket information.

Figure 4:
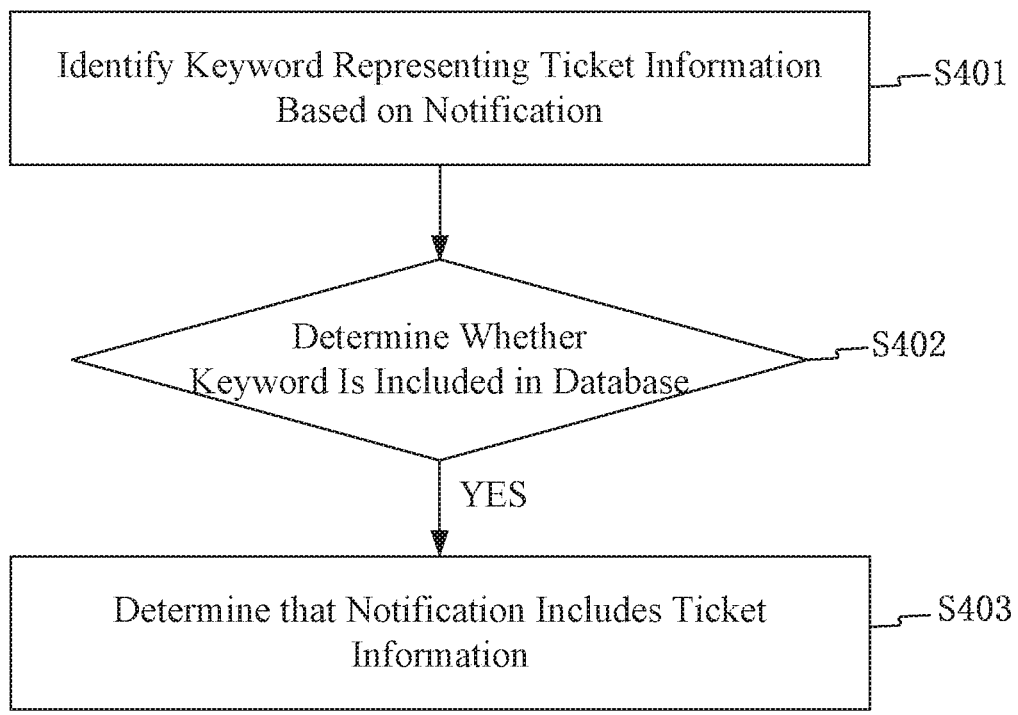
FIG. 4 is a flowchart of another method for providing ticket information, according to an exemplary embodiment.

FIG. 4 is a flowchart of a method 400 for providing ticket information, according to an exemplary embodiment. The method 400 may be performed by a terminal device, such as a smart phone or a tablet device. Referring to FIG. 4, the method 400 includes the following steps.

In step S401, the terminal device identifies a keyword representing the ticket information based on the notification.

In step S402, the terminal device determines whether the keyword is included in a database. The database is configured to store keywords included in ticket information.

In step S403, if the keyword is included in the database, the terminal device determines that the notification includes the ticket information. In some implementations, if no keyword is included in the database, no process is performed by the terminal device. For example, the notification may be presented in a usual form such as a text form.

In some embodiments, the keyword in the notification may be identified by semantic recognition. For example, semantic matching between the keyword and the keywords in the database may be performed. If the matching is successful, i.e., the keyword is included in the database, then the terminal device determines that the notification includes the ticket information. The database may be continuously updated according to the keywords representing ticket information, so as to improve the accuracy of identifying the ticket information. For example, "movie ticket" may be identified from a notification by semantic recognition, and semantic matching between the "movie ticket" in the notification and the keywords in the database may be performed. If the keyword "movie ticket" is included in the database, the terminal device then determines that the notification includes ticket information. As another example, if keywords such as "ticket release", or "go to the movie theater on time" are identified in the notification, and these keywords can be found in the database, the terminal device may determine that the notification includes the ticket information.

By identifying the ticket information based on the keyword in the notification and the database, the accuracy for identifying the ticket information may be improved. The database may be continuously updated according to keywords representing ticket information, so as to improve the accuracy and efficiency of identifying keywords in the notification.

Figure 5:
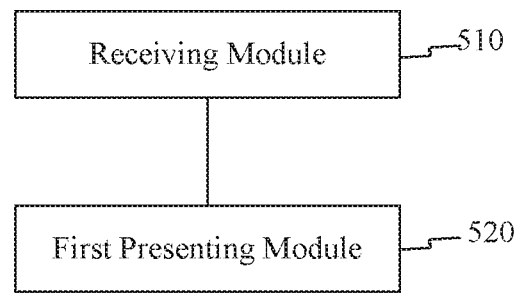
FIG. 5 is a block diagram of a device for providing ticket information, according to an exemplary embodiment.

FIG. 5 is a block diagram of a device 500 for providing ticket information, according to an exemplary embodiment. The device 500 may be implemented as a part or all of a terminal device. Referring to FIG. 5, the device 500 includes a receiving module 510 and a first presenting module 520.

The receiving module 510 is configured to receive a notification.

The first presenting module 520 is configured to, if the notification received by the receiving module 510 includes ticket information, provide the ticket information in a multimedia message.

Figure 6:
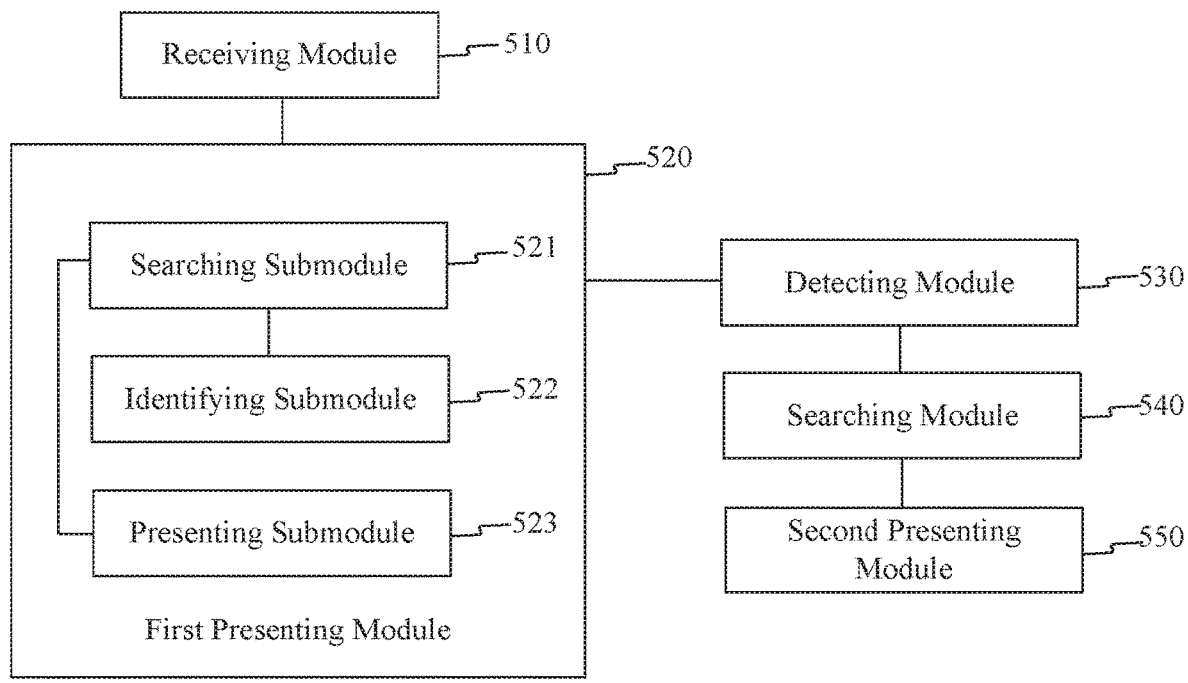
FIG. 6 is a block diagram of a device for providing ticket information, according to an exemplary embodiment.

FIG. 6 is a block diagram of a device 600 for providing ticket information, according to an exemplary embodiment. The device 600 may be implemented as a part or all of a terminal device. Referring to FIG. 6, the device 600 includes a detecting module 530, a searching module 540, and a second presenting module 550, in addition to the receiving module 510 and the first presenting module 520.

As shown in FIG. 6, the first presenting module 520 includes a searching submodule 521, an identifying submodule 522, and a presenting submodule 523.

The searching submodule 521 is configured to search a poster based on the ticket information via a network interface.

The identifying submodule 522 is configured to identify a ticket name and seat information in the ticket information.

The presenting submodule 523 is configured to provide the poster obtained by the searching submodule 521, the ticket name and the seat information identified by the identifying submodule 522 in a multimedia message.

The detecting module 530 is configured to detect whether a trigger action is received on the multimedia message provided by the first presenting module 520.

The searching module 540 is configured to, if the trigger action is detected by the detecting module 530, search additional ticket information via a network interface.

The second presenting module 550 is configured to update the multimedia message to include the additional ticket information obtained by the searching module 540.

Figure 7:
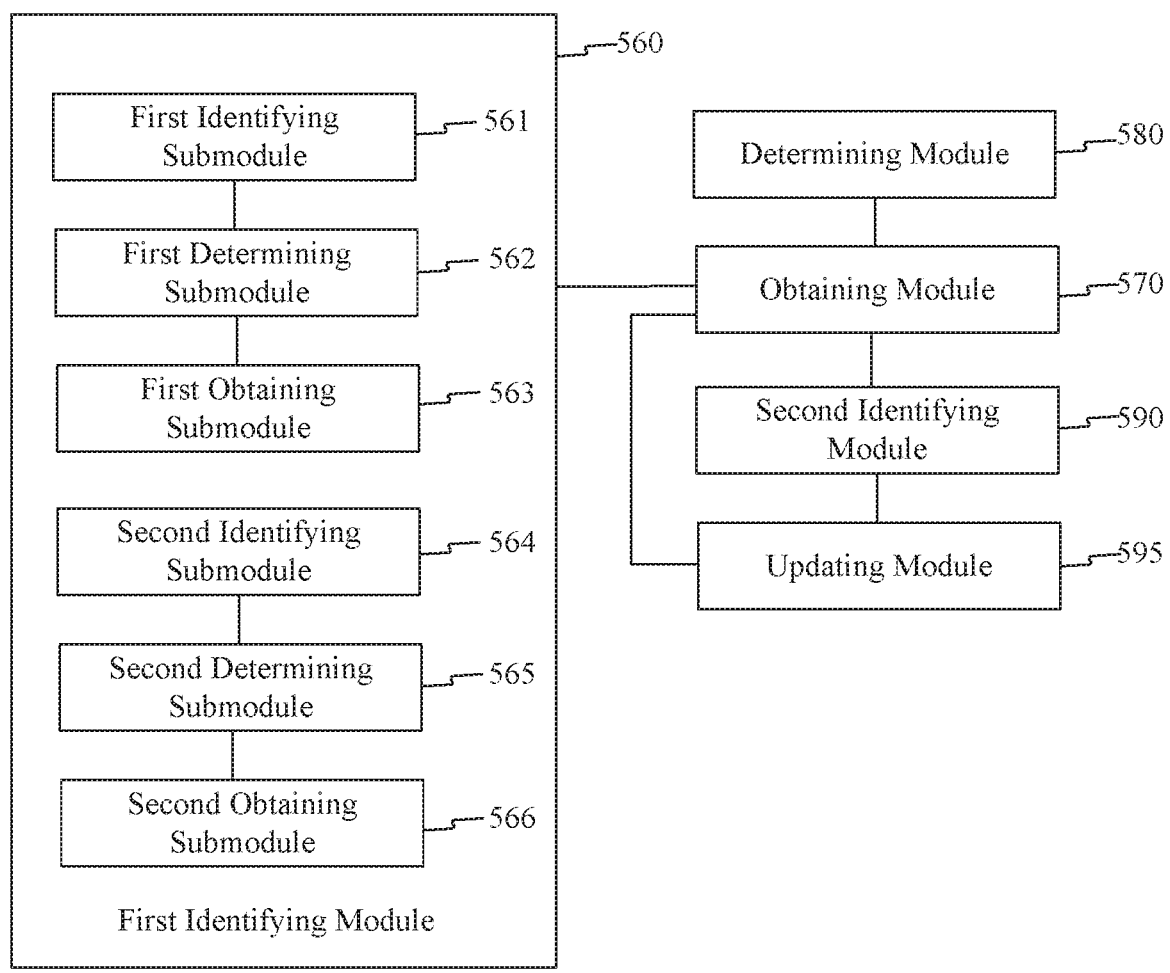
FIG. 7 is a block diagram of another device for providing ticket information, according to an exemplary embodiment.

FIG. 7 is a block diagram of a device 700 for providing ticket information, according to an exemplary embodiment. The device 700 may be implemented as a part or all of a terminal device. Referring to FIG. 7, the device 700 includes a first identifying module 560, an obtaining module 570, a determining module 580, a second identifying module 590, and an updating module 595.

The first identifying module 560 is configured to identify an e-commerce platform providing the ticket information based on the notification received by the receiving module 510.

The obtaining module 570 is configured to obtain a text message template corresponding to the e-commerce platform identified by the first obtaining module 560 from a template database, where the template database is configured to store text message templates of e-commerce platforms.

The determining module 580 is configured to determine whether ticket information is included in the notification according to the text message template obtained by the obtaining module 570.

Referring to FIG. 7, the first identifying module 560 includes a first identifying submodule 561, a first determining submodule 562, a first obtaining submodule 563, a second identifying submodule 564, a second determining submodule 565, and a second obtaining submodule 566.

The first identifying submodule 561 is configured to identify a keyword in the notification.

The first determining submodule 562 is configured to determine whether the keyword identified by the first identifying submodule 561 is included in a first database, where the first database is configured to store enterprise names corresponding to keywords.

The first obtaining submodule 563 is configured to, if the first determining submodule 562 determines that the keyword is included in the first database, obtain an enterprise name stored in the first database corresponding to the t keyword as the e-commerce platform providing the ticket information.

The second identifying submodule 564 is configured to identify a text message number associated with the notification, such as the text message number of the sender sending the notification.

The second determining submodule 565 is configured to determine whether the text message number identified by the second identifying submodule 564 is included in a second database, where the second database is configured to store enterprise names corresponding to the text message numbers.

The second obtaining submodule 566 is configured to, if the second determining submodule 565 determines that the text message number is included in the second database, obtain an enterprise name in the second database corresponding to the text message number as the e-commerce platform providing the ticket information.

The second identifying module 590 is configured to identify whether a text message template corresponding to the e-commerce platform is stored in the template database.

If the second identifying module 590 identifies that a text message template corresponding to the e-commerce platform is included in the template database, the obtaining module 570 obtains the text message template corresponding to the e-commerce platform from the template database.

The updating module 595 is configured to, if the second identifying module 590 determines that no text message template corresponding to the e-commerce platform is included in the template database, update the template database to include the text message template, so that the obtaining module 570 may obtain, from the updated template database, the text message template corresponding to the e-commerce platform identified by the first identifying module 560.

Figure 8:
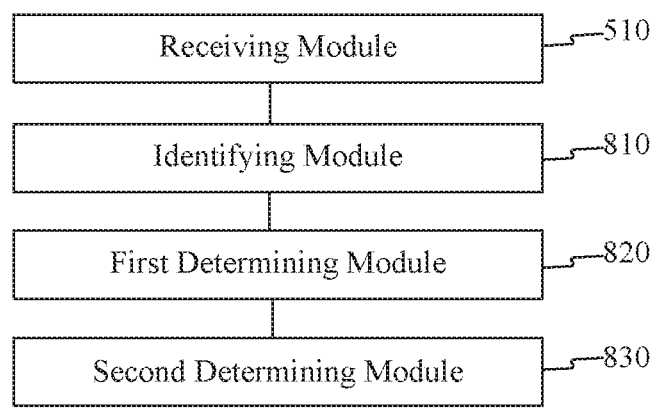
FIG. 8 is a block diagram of another device for providing ticket information, according to an exemplary embodiment.

FIG. 8 is a block diagram of a device 800 for providing ticket information, according to an exemplary embodiment. The device 800 may be implemented as a part or all of a terminal device. Referring to FIG. 8, the device 800 includes an identifying module 810, a first determining module 820, and a second determining module 830, in addition to the receiving module 510.

The identifying module 810 is configured to identify a keyword representing the ticket information based on the notification received by the receiving module 510.

The first determining module 820 is configured to determine whether the keyword identified by the identifying module 810 is included in a database, wherein the database is configured to store keywords included in ticket information.

The second determining module 830 is configured to, if the first determining module 820 determines that the keyword is included in the database, determine that the notification includes the ticket information.

Figure 9:
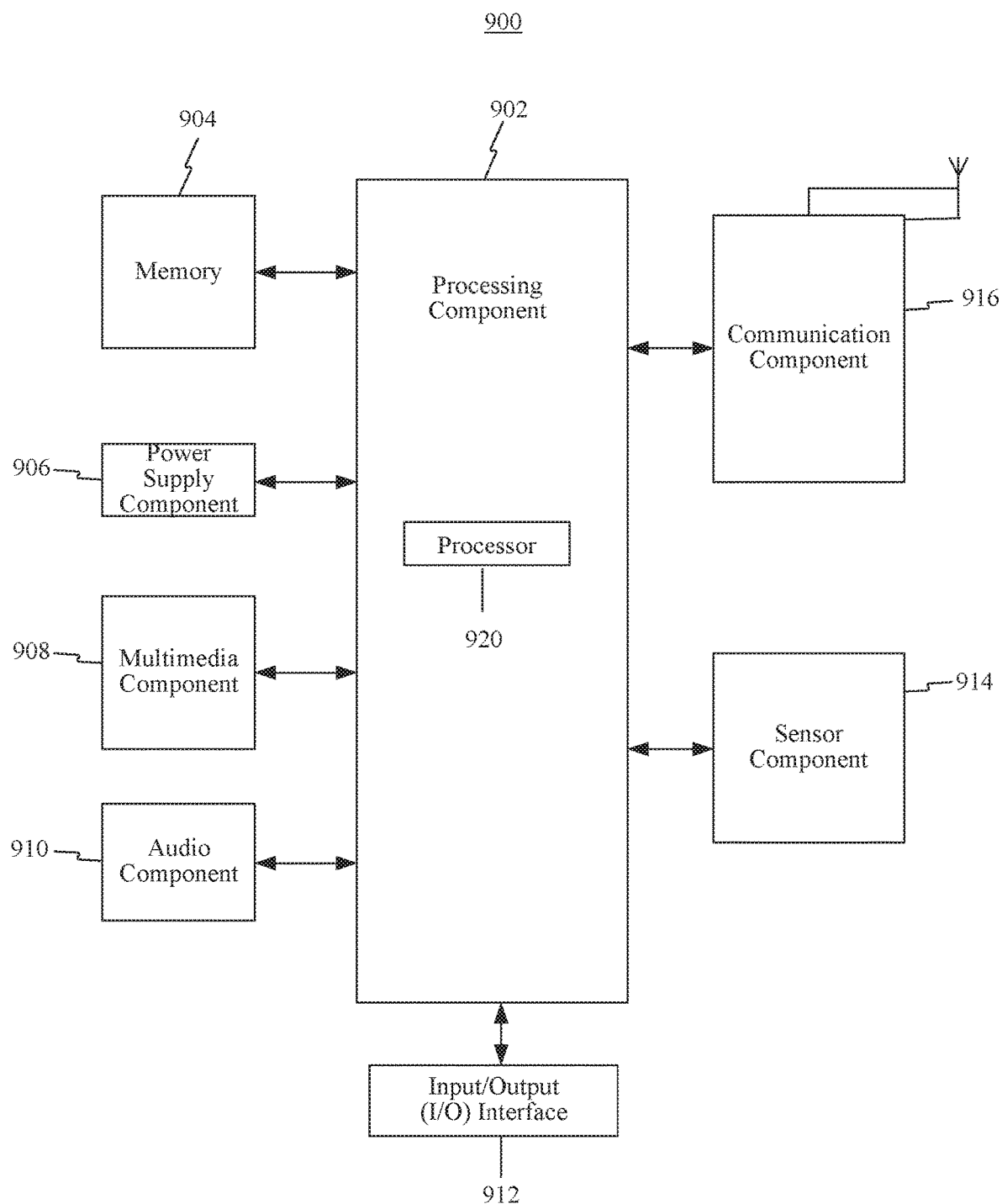
FIG. 9 is a block diagram of a terminal device for providing ticket information, according to an exemplary embodiment.

FIG. 9 is a block diagram of a terminal device 900 for providing ticket information, according to an exemplary embodiment. For example, the terminal device 900 may be a mobile phone, a computer, a digital broadcast terminal, a messaging device, a gaming console, a tablet device, a medical device, exercise equipment, a personal digital assistant (PDA), and the like.

Referring to FIG. 9, the terminal device 900 may include one or more of the following components: a processing component 902, a memory 904, a power supply 906, a multimedia component 908, an audio component 910, an input/output (I/O) interface 912, a sensor component 914, and a communication component 916. The person skilled in the art should appreciate that the structure of the terminal device 900 as shown in FIG. 9 does not intend to limit the terminal device 900. The terminal device 900 may include more or less components or combine some components or other different components.

The processing component 902 typically controls overall operations of the terminal device 900, such as the operations associated with display, telephone calls, data communications, camera operations, and recording operations. The processing component 902 may include one or more processors 920 to execute instructions to perform the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the terminal device 900. Examples of such data include instructions for any applications or methods operated on the terminal device 900, contact data, phonebook data, messages, images, video, etc. The memory 904 is also configured to store programs and modules. The processing component 902 performs various functions and data processing by operating programs and modules stored in the memory 904. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 906 is configured to provide power to various components of the terminal device 900. The power supply component 906 may include a power management system, one or more power sources, and any other components associated with the generation, management, and distribution of power in the terminal device 900.

The multimedia component 908 includes a screen providing an output interface between the terminal device 900 and a user. In some embodiments, the screen may include a liquid crystal display (LCD) and/or a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the terminal device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone configured to receive an external audio signal when the terminal device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the terminal device 900. For instance, the sensor component 914 may detect an on/off state of the terminal device 900, relative positioning of components, e.g., the display and the keypad, of the terminal device 900, a change in position of the terminal device 900 or a component of the terminal device 900, a presence or absence of user contact with the terminal device 900, an orientation or an acceleration/deceleration of the terminal device 900, and a change in temperature of the terminal device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the terminal device 900 and other devices. The terminal device 900 can access a wireless network based on a communication standard, such as WiFi, 2G; or 3G; 4G; or a combination thereof. In one exemplary embodiment, the communication component 916 receives a broadcast signal or broadcast information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the terminal device 900, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for providing ticket information on a terminal device, comprising:
   receiving, by the terminal device, a notification from an e-commerce platform;
   identifying the e-commerce platform based on the notification;
   determining whether a text message template corresponding to the e-commerce platform is included in a template database, wherein the template database is configured to store a plurality of text message templates of a plurality of e-commerce platforms;
   if the text message template is included in the template database, determining whether the notification includes the ticket information based on textual content identified from the notification in accordance with a format of the text message template;
   if the notification includes the ticket information, providing the ticket information in a multimedia message on a screen of the terminal device, the multimedia message including a user interface for receiving a trigger action;
   detecting whether the trigger action is received from the user interface;
   if the trigger action is received from the user interface, obtaining additional ticket information based on the textual content via a network interface of the terminal device; and
   updating the multimedia message to include the additional ticket information.

2. The method according to claim 1, wherein the providing the ticket information in a multimedia message comprises:
   obtaining a poster based on the ticket information via a network interface;
   identifying a ticket name and seat information based on the notification; and
   providing the poster, the ticket name, and the seat information in the multimedia message.

3. The method according to claim 1, wherein the identifying the e-commerce platform based on the notification comprises:
   identifying a keyword in the notification;
   determining whether the keyword is included in a database, wherein the database is configured to store a plurality of enterprise names corresponding to a plurality of keywords; and
   if the keyword is included in the database, obtaining an enterprise name in the database corresponding to the keyword as the e-commerce platform providing the ticket information.

4. The method according to claim 1, wherein the identifying the e-commerce platform based on the notification comprises:
   identifying a text message number associated with the notification;
   determining whether the text message number is included in a database, wherein the database is configured to store a plurality of enterprise names corresponding to a plurality of text message numbers; and
   if the text message number is included in the database, obtaining an enterprise name in the database corresponding to the text message number as the e-commerce platform providing the ticket information.

5. The method according to claim 1, further comprising:
   if the text message template corresponding to the e-commerce platform is not included in the template database, sending a request to a server associated with the e-commerce platform, receiving the text message template corresponding to the e-commerce platform from the server, and updating the template database to include the text message template.

6. The method according to claim 1, further comprising:
   identifying a keyword representing the ticket information based on the notification;
   determining whether the keyword is included in a database, wherein the database is configured to store a plurality of keywords in the ticket information; and
   if the keyword is included in the database, determining that the notification includes the ticket information.

7. The method according to claim 1, wherein the notification includes a text message or an instant messaging (IM).

8. A device for providing ticket information, comprising:
   a processor;
   a screen coupled to the processor; and
   a memory for storing instructions executable by the processor;
   wherein the processor is configured to:
      receive a notification from an e-commerce platform;
      identify the e-commerce platform based on the notification;
      determine whether a text message template corresponding to the e-commerce platform is included in a template database, wherein the template database is configured to store a plurality of text message templates of a plurality of e-commerce platforms;
      if the text message template is included in the template database, determine whether the notification includes the ticket information based on textual content identified from the notification in accordance with a format of the text message template;
      if the notification includes the ticket information, provide the ticket information in a multimedia message on the screen of the device, the multimedia message including a user interface for receiving a trigger action;
      detect whether the trigger action is received from the user interface;
      if the trigger action is received from the user interface, obtain additional ticket information based on the textual content via a network interface of the terminal device; and
      update the multimedia message to include the additional ticket information.

9. The device according to claim 8, wherein the processor is further configured to:
   obtain a poster based on the ticket information via a network interface;
   identify a ticket name and seat information based on the notification; and
   provide the poster, the ticket title and the seat information in the multimedia message.

10. The device according to claim 8, wherein the processor is further configured to:
    identify a keyword in the notification;
    determine whether the keyword is included in a database, wherein the database is configured to store a plurality of enterprise names corresponding to a plurality of keywords; and if the keyword is included in the database, obtain an enterprise name in the database corresponding to the keyword as the e-commerce platform providing the ticket information.

11. The device according to claim 8, wherein the processor is further configured to:
identify a text message number associated with the notification;
determine whether the text message number is included in a database, wherein the database is configured to store a plurality of enterprise names corresponding to a plurality of text message numbers; and
if the text message number is included in the database, obtain an enterprise name in the database corresponding to the text message number as the e-commerce platform providing the ticket information.

12. The device according to claim 8, wherein the processor is further configured to:
if the text message template corresponding to the e-commerce platform is not included in the template database, send a request to a server associated with the e-commerce platform, receive the text message template corresponding to the e-commerce platform from the server, and update the template database to include the text message template.

13. The device according to claim 8, wherein the processor is further configured to:
identify a keyword representing the ticket information based on the notification;
determine whether the keyword is included in a database, wherein the database is configured to store a plurality of keywords in the ticket information; and
if the keyword is included in the database, determine that the notification includes the ticket information.

14. The device according to claim 8, wherein the notification includes a text message or an instant messaging (IM).

15. A non-transitory computer-readable storage medium having stored therein instructions that, when executed by a processor of a terminal device, cause the terminal device to perform a method for providing ticket information, the method comprising:
receiving, by the terminal device, a notification from an e-commerce platform;
identifying the e-commerce platform based on the notification;
determining whether a text message template corresponding to the e-commerce platform is included in a template database, wherein the template database is configured to store a plurality of text message templates of a plurality of e-commerce platforms;
if the text message template is included in the template database, determining whether the notification includes the ticket information based on textual content identified from the notification in accordance with a format of the text message template;
if the notification includes the ticket information, providing the ticket information in a multimedia message on a screen of the terminal device, the multimedia message including a user interface for receiving a trigger action;
detecting whether the trigger action is received from the user interface;
if the trigger action is received from the user interface, obtaining additional ticket information based on the textual content via a network interface of the terminal device; and
updating the multimedia message to include the additional ticket information.

16. The non-transitory computer-readable storage medium of claim 15, wherein the format of the text message template arranges a plurality of types of ticket information in an order separated by a plurality of punctuation marks.

17. The non-transitory computer-readable storage medium of claim 16, wherein identifying the textual content from the notification comprises:
identifying corresponding textual content in the notification in accordance with the text message template, wherein the textual content is between the plurality of punctuation marks.

18. The non-transitory computer-readable storage medium of claim 15, wherein the ticket information comprises an event, a place, and a time period.

19. The non-transitory computer-readable storage medium of claim 18, wherein the ticket is an admission ticket for a movie, and the additional information includes at least one of a poster of the movie, a review of the movie, and a cast member of the movie.

20. The non-transitory computer-readable storage medium of claim 19, wherein the multimedia message arranges the poster above the place and the time period in the user interface.

* * * * *